Patented June 23, 1953

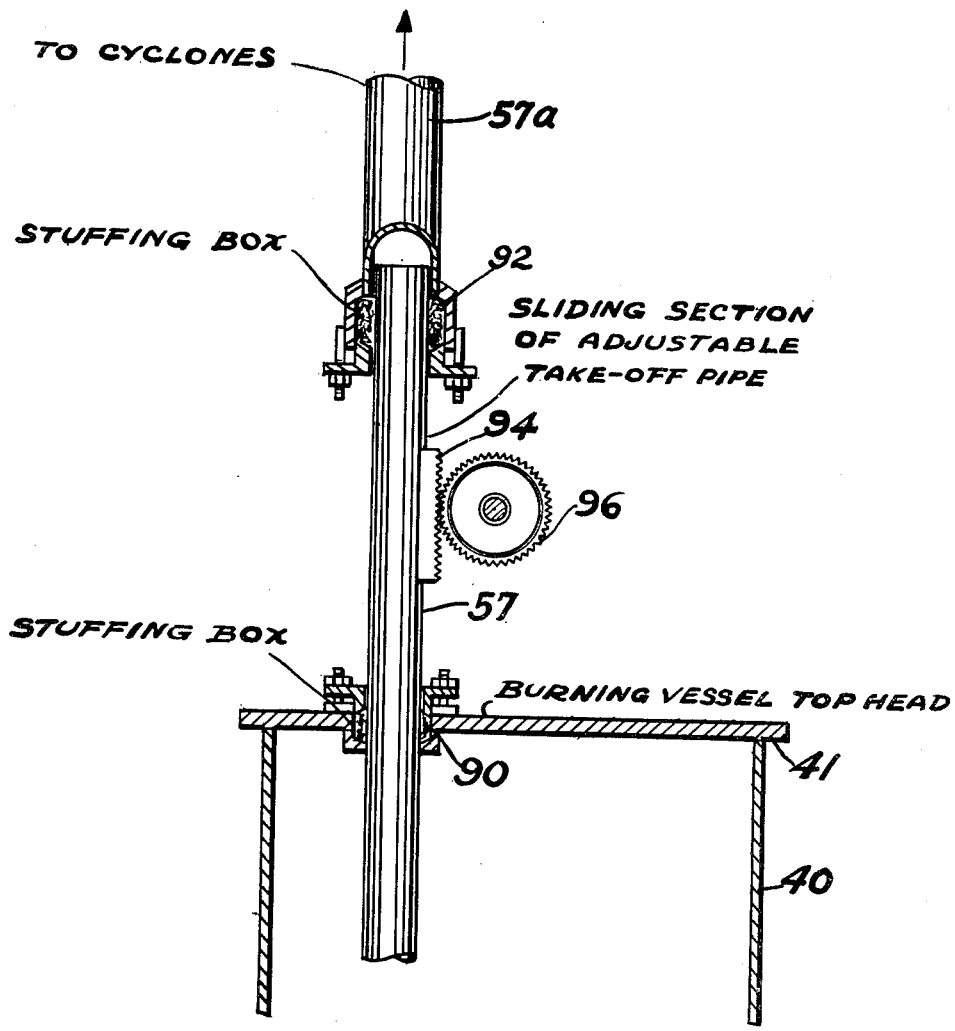

2,643,219

UNITED STATES PATENT OFFICE 2,643,219

FLUIDIZED DISTILLATION OF OIL-SHALE

James W. Carr, Jr., Lindsay I. Griffin, Jr., and Edward W. S. Nicholson, Baton Rouge, La., assignors to Standard Oil Development Company, a corporation of Delaware Application June 21, 1949, Serial No. 100,492

6 Claims. (Cl. 202—14)

Figure 2:
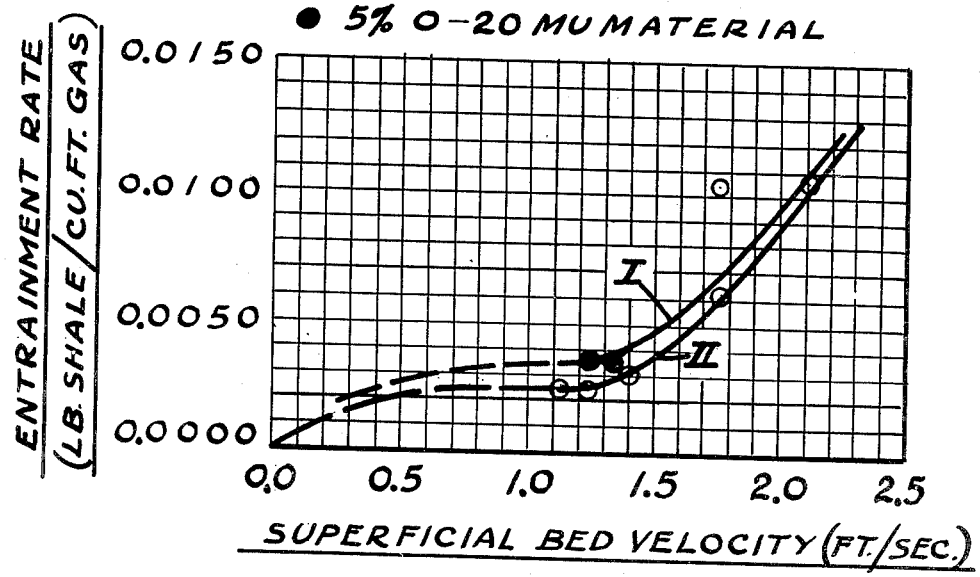
Figure 3:
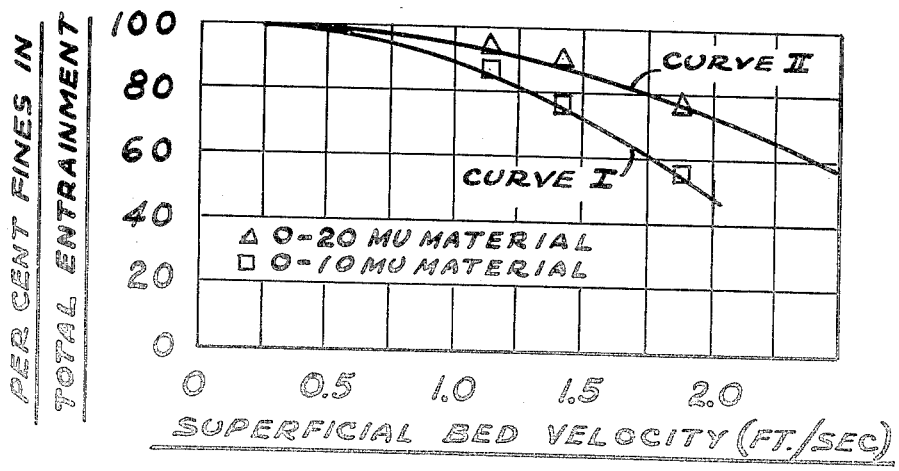
Figure 4:
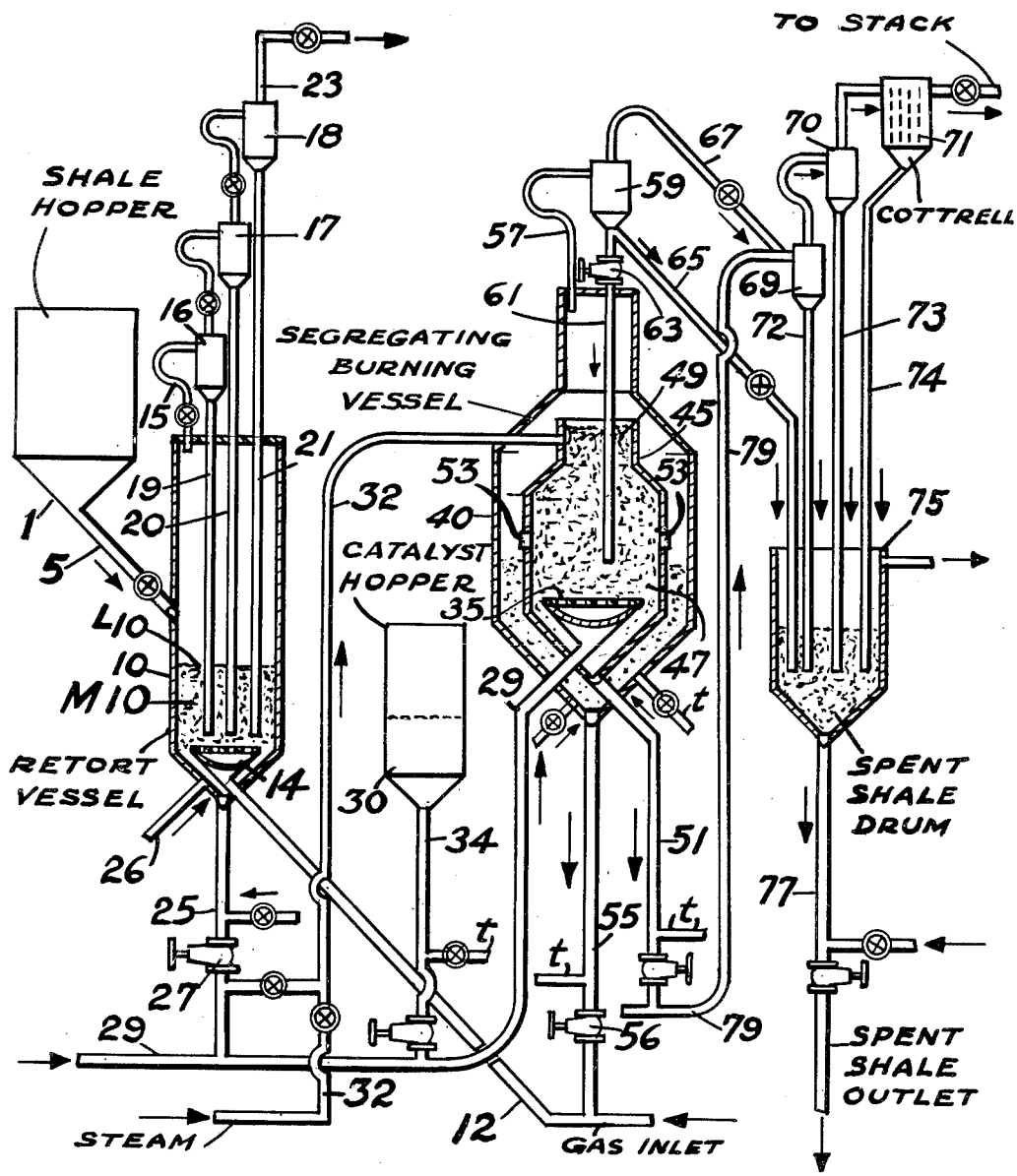

The present invention relates to the art of distilling carbonaceous solids, such as oil-bearing minerals including oil shale, oil sands, tar sands, and the like, maintained in the form of subdivided particles in a highly turbulent state fluidized by upwardly flowing gases to resemble a boiling liquid, wherein the heat required for distillation is supplied by burning spent solid distillation residue in a separate combustion zone and circulating hot solid combustion residue to the distillation zone. More particularly, the present invention relates to improved means for controlling the particle size of the fluidized solids masses and circulating solids within desirable ranges. The invention will be fully explained hereinafter with reference to the accompanying drawing in which Figures 1 to 3 are graphical illustrations of effects obtainable in accordance with the invention;

Figure 4 is a semi-diagrammatical illustration of a system suitable to carry out the process of the invention; and Figure 5 is a similar illustration of a specific embodiment of the invention.

Prior to the present invention, it has been proposed to carry out the pyrolytic treatment or distillation of oil shale in the form of subdivided solids ranging in particle size from a fine powder up to rather large aggregates of, say, about ¼ inch diameter in a highly turbulent fluidized state while supplying the heat required by this reaction as sensible heat of hot solid combustion residue in the manner indicated above. The principal problem encountered in this type of operation arises as the result of a strong tendency of the shale to disintegrate rapidly in the course of the pyrolytic treatment to particles of extremely small size which complicate and frequently even provent proper fluidization and solids circulation. The maintenance of proper fluidization conditions normally requires a relatively low percentage, say, less than about 20–55% of particle sizes below 20 microns diameter. However, it is desirable in commercial operation to maintain the fines concentration between 20 and 25% because relatively high apparent densities of the circulating solids permit the use of lower standpipes and a lower surface area of the particles reduces undesirable oil adsorption on the circulating solids, in the retort. The oil shale powder formed during distillation has a particle size generally below 40 microns and mostly below 20 microns, independent of the particle size of the raw shale. In addition, spent shale, that is the solid residue from the distillation stage, has a very high attrition rate amounting to about 10–20 times the attrition rate of other fluidizable siliceous material, such as conventional fluid cracking catalyst.

Figure 1:
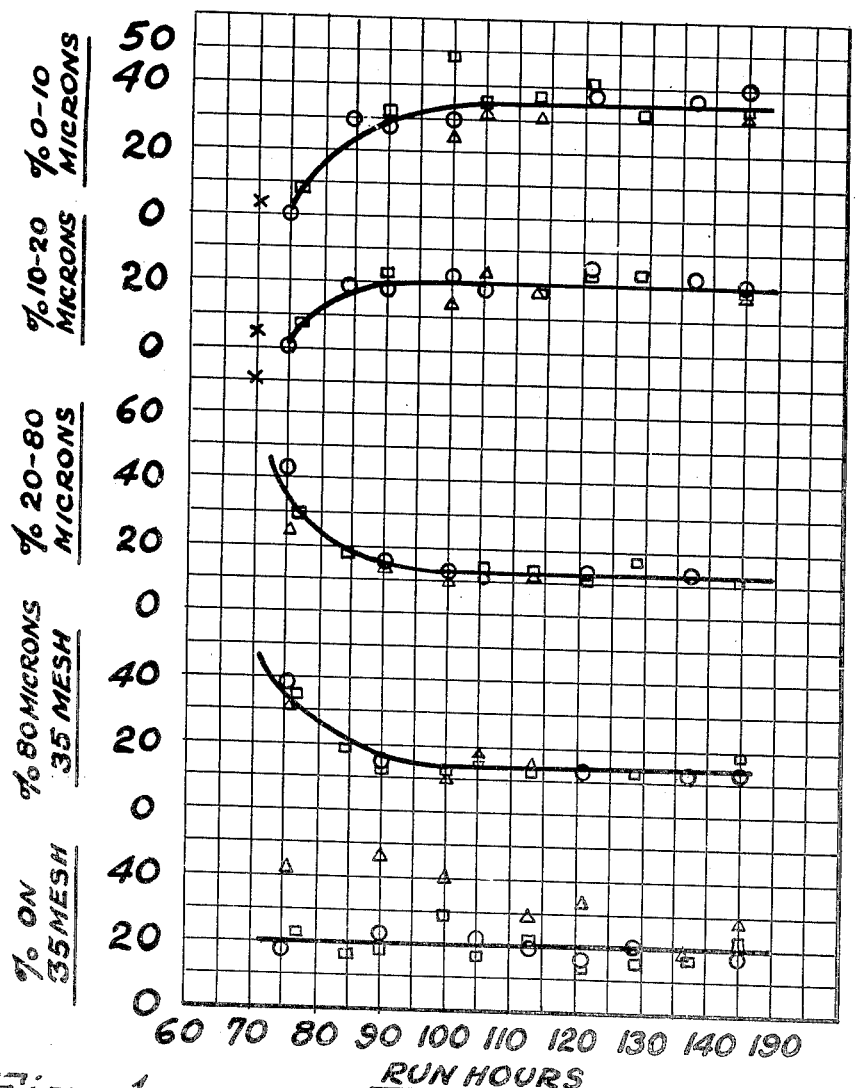

These shale characteristics are illustrated in Figure 1 which summarizes in graphical form the disintegration and attrition of retorted shale, that is solid residue from the distillation stage, in pilot plant operation. The experiments yielding these data were carried out in a two-vessel fluid retorting system operating at the following conditions:

| | |
|---|---|
| Retort | 900°–940° F. |
| Burner | 1000°–1080° F. |
| Feed rate | 800 #/hr. |
| Burner overhead losses (no recovery system) | 350–500 lbs./hr. |
| Retort velocity | 1.0 ft./sec. |
| Burner velocity | 1.5–2.0 ft./sec. |
| Circulation rate | 180–210 #/min. |

Before fresh shale was charged, the system was brought up to temperatures using a fluidized circulating charge of spent silica-alumina cracking catalyst having a particle size distribution as follows:

| Size: | Weight, per cent |
|---|---|
| 0–10 microns | 4 |
| 10–20 microns | 5 |
| 20–80 microns | 71 |
| 80–400 microns | 20 |

The charge was heated by circulation through a gas fired heat exchanger until a temperature of 650° F. was reached at which point torch oil was injected into the burner to raise the charge to distillation temperature. Thereafter, the system was placed on steam using raw shale containing only 2% material less than 80 microns and passing three mesh.

The data presented in Figure 1 show rapid disintegration of the fresh shale within about 24 hours after the raw shale was first added which took place 75 hours from the time heating of the spent catalyst charge was begun. It will be appreciated that this rate of disintegration, if unchecked, causes a rapid accumulation of shale fines in a system of the two-vessel type described above wherein the shale is maintained for a considerable length of time at and above distillation temperatures and continuously subjected to attrition in the turbulent fluidized beds as well as during circulation between the combustion and distillation zones. As this fines accumulation proceeds, fluidization becomes irregular and all solids are eventually carried overhead by the fluidizing gases. The present invention is designed to overcome this difficulty.

It is, therefore, the principal object of the present invention to provide improved means for controlling the particle size of oil shale undergoing distillation in a fluid-type distillation system wherein the shale is continuously circulated between a distillation zone and a heat-generating combustion zone. Other and more specific objects and advantages will appear from the description of the invention given below wherein reference will be made to the accompanying drawing.

In accordance with the present invention, excessive accumulation of shale fines is prevented by the selective removal of the shale fines of undesirably small particle size from the fluidized shale beds with the aid of the elutriating effect of the upwardly flowing fluidizing gases. In accordance with the preferred embodiment of the invention, this elutriation of fines takes place predominantly or exclusively in the combustion zone. In this manner, losses of oil products and fuel which are associated with the shale fines in the distillation zone may be substantially reduced. As a further result, an equilibrium fines concentration in the circulating solids is established. This is illustrated by the curves of Figure 1 wherein the pilot plant operating at the conditions described and in accordance with the present invention reached equilibrium particle size of 55% 0–20 microns particles within about 30 hours. It will be understood, of course, that a lower fines equilibrium may be attained when the linear superficial gas velocity in the burner is increased above the 2.0 ft. per second specified above as an upper limit, provided complete bed blow-out is prevented.

It has also been found, that the spent shale, even after it has been burned in the combustion stage, includes a substantial proportion of, say, about 12 to 28% of relatively large particles of about 420 to 7,000 microns diameter which are highly attrition resistant. Accumulation of this coarse material when accompanied by the removal of fines in accordance with the invention will lead to an undesirable particle size distribution toward excessively large particle sizes and thus to fluidization difficulties. This may be avoided in accordance with a preferred embodiment of the invention by a controlled and selective, substantially simultaneous removal of undesirably small shale fines overhead and of undesirably large particles downwardly, from a fluidized shale bed, under the elutriating influence of the fluidizing gases.

Whenever the particle size controls described above are found to be inadequate to establish proper fluidization conditions, particularly as a result of a deficiency in particles of intermediate size ranges, such as about 60–200 microns diameters, the invention provides for the addition of extraneous material of such particle size in proportions adequate to establish the proper particle size distribution. Concentrations of 25 to 50% of particles of this intermediate size are normally desirable. While any inert material having a specific gravity in the neighborhood of that of spent shale, such as sand, clay, etc., may be used for this purpose, greatest advantages are secured when conventional cracking catalysts, such as various natural or artificial clays, suitable composites of silica, alumina and/or magnesia, or the like, are employed as the extraneous material of intermediate particle size. In this manner, the invention affords a substantial improvement in the yield and quality of the gasoline range hydrocarbons produced, in addition to the stabilization of the fluidity characteristics in the reaction zones.

Extensive research work has demonstrated that shale fluidization is satisfactory at superficial linear gas velocities of about 0.3–3 ft. per second, provided that the concentration of fines of 0–20 microns diameter does not exceed 25–50% of the total. Segregation of the fines from the coarse material in the fluidized bed occurs in that portion of the velocity range just indicated which lies below 1.2 ft. per second but only when the fines content is maintained at less than 25% of 0–20 micron particle size. This segregation occurs without any detrimental effect on the fluidity characteristics of the fine portion of the fluidized bed.

Selective elutriation of the finer particles from the bed occurs as is illustrated in Figure 2 which shows a diagram wherein the shale entrainment rate expressed as pounds of shale per cu. ft. of gas is plotted against the superficial linear velocity of the fluidizing gas in the fluidized bed, for the fluid shale beds containing 5% (Curve I) and 30% (Curve II) of fines of 0–20 microns diameter, respectively. The initial and final particle size distribution of the solids tested was as follows:

TABLE I

*Shale entrainment studies*

|  | Curve II | | | | Curve I | |
|---|---|---|---|---|---|---|
|  | 1st Series | | 2nd Series | | 3rd Series | |
|  | Initial | Final | Initial | Final | Initial | Final |
| 0–20 Microns | [1] 26.5 | 30.5 | 28.5 | 33.0 | 2.5 | 8.0 |
| 20–40 Microns | | 5.0 | 4.0 | 4.0 | 0.5 | 1.0 |
| 40–80 Microns | | 8.5 | 4.5 | 4.0 | 1.5 | 2.5 |
| 80–100 Microns | | 2.0 | 1.0 | 1.0 | 1.5 | 0.5 |
| On 150 Mesh | | 4.0 | 14.0 | 9.0 | 11.5 | 9.0 |
| On 80 Mesh | | 13.0 | 17.0 | 14.0 | 19.0 | 14.5 |
| On 35 Mesh | | 12.5 | 13.0 | 11.0 | 17.5 | 15.5 |
| On 20 Mesh | | 17.0 | 13.5 | 16.0 | 39.0 | 40.5 |
| On 8 Mesh | | 7.5 | 4.5 | 8.0 | 7.0 | 8.5 |
| On 3 Mesh | | 0 | 0 | 0 | 0 | 0 |

[1] No sample available; fines content estimated, based on attrition rate shown during second series.

The tests were carried out as follows:

The spent shale used in these tests was obtained by previous operation of a single vessel fluid retorting pilot plant. Raw shale of approximately ¼ inch maximum particle size was fed to the top of the fluid bed and the coarser spent shale was withdrawn from the bottom of the bed. Entrained fines, called spent shale fines, were collected on filters from the gas stream leaving the retort. The bed was fluidized by steam containing sufficient air to burn residual carbon on the shale and provide heat necessary for the distillation of the oil. The range of operating conditions over which the spent shale used in these tests was collected are as follows:

Fluidizing velocities _____ 0.73 to 3.5 ft./sec.
Retort temperatures, °F _____ 920° to 1040° F.
Shale feed rate _____ 30 to 100 lbs./hr.
Oil content of shale _____ 48 to 42 gal./ton
Nominal holding time _____ 18 to 53 minutes
(inventory feed rate).

Entrainment tests were carried out in a 12 inch glass vessel with the two returning cyclones disconnected and returning to separate collecting cans. The unit was charged with known weights of a mixture of coarse and fine spent shales obtained as described above and operated at a given gas velocity for a short period. The total overhead collections were collected, weighed and sampled for particle size determinations. With the weight of material carried overhead and the gas velocity, the entrainment loss in pounds per cubic foot of gas could be calculated. Three separate charges were run at each of several velocities with the overhead collections being returned to the fluidized bed prior to each change of velocity. The first two were mixed to contain 30% 0–20 micron particle size and were run for confirmation of the data. The third test was run with 5% 0–20 micron particle size to determine the effect of particle size. The total particle sizes of the three materials tested are listed in Table I. The curves of Figure 2 show that there is a critical gas velocity of about 1.5 ft. per second above which carry-over of entrained solids increases rapidly as the flow velocity is increased. On the basis of these experimental results the invention provides for maintaining superficial linear fluidizing gas velocities of about 1.5–3 ft. per second, particularly in the combustion section of a two-vessel shale distillation system.

The flow velocity within this range may be chosen in such a manner that a fines removal rate is established which approaches that of the fresh shale feed to the distillation zone. However, it is also possible so to control the velocity of the fluidizing gas above about 1.5 ft. per second that the fines concentration in the fluid bed is maintained at less than 25% and that segregation of coarse material takes place in the lower portions of the bed, effecting a particle size control entirely independent of the fresh feed and solids circulation rates. Systems suitable for this purpose will be described below with reference to Figures 4 and 5 of the drawing.

As pointed out above, the particle size distribution may be further improved by the addition of extraneous solids of intermediate particle size whenever the fluid bed is deficient in such particle sizes. When operating at the flow velocities of the invention this material of intermediate size will be retained in the system with little loss by entrainment. This is borne out by the data presented in Figure 3 in which the fines concentration (0–10 microns material in Curve I, 0–20 microns material in Curve II) in the total entrainment is plotted against linear superficial velocity of the fluidizing gas in the fluidized bed. It will be seen from Figure 3 that even at high total entrainment rates corresponding to the higher gas velocities, the proportion of material of more than 20 microns particle size in the total entrainment is relatively small amounting to less than about 40%. Loss of material of intermediate size with the coarse material withdrawn from the lower portions of the bed may be minimized by an effective segregation within the bed as will appear more clearly hereinafter.

The overhead removal of fines, particularly from the combustion zone, in accordance with the present invention may be made still more selective by introducing at least a substantial portion of the spent shale withdrawn from the distillation zone into an upper portion of the combustion zone, preferably above or just below the dense phase interface. It has been found that the selectivity toward fines entrainment, preferentially over the entrainment of coarser materials, increases as the carbon content on the solids increases. The carbon content of the spent shale is highest before it is subjected to combustion. Therefore, when the spent shale is introduced into the top of the burner bed, the high-carbon fines are selectively elutriated as they enter the bed and removed from the bed in a gas which is essentially a flue gas poor in oxygen, produced in the lower portions of the burner bed, so that these fines are not burned, but retain their high carbon content and with it their high gas buoyancy. The coarser particles, on the other hand, entering the top of the burner bed pass downward into the body of the fluidized burner bed and are burned substantially free of fixed carbon before they are returned to the distillation zone for heat supply. The oxygen in the combustion-supporting gas supplied to the bottom of the burner is burned to a low concentration to form the flue gas just mentioned.

If the distillation zone or retort is located above the combustion zone or burner, the retorted shale particles may be discharged directly into the top of the burner through a conventional standpipe provided with a slide valve. The combustion-supporting gas is supplied to the bottom of the burner where the burnt particles are withdrawn for recycling to the retort. If the retort is located below the burner or at the same level, a part of the retorted solids may be circulated to the top of the burner, preferably suspended in flue gas or steam, and another, preferably larger, portion may be introduced at the bottom of the burner preferably with the entering stream of combustion-supporting gas. If desired, mixing of the incoming high-carbon fines with the rest of the fluidized bed may be reduced by restricting free circulation of fluidized solids between the upper and lower portions of the bed. This may be accomplished in any manner known per se, for example by arranging a non-fluidizable packing or a perforated plate with downcomer in the upper portion of the fluidized bed.

It may also be desirable in certain cases to introduce the fresh shale into the retort at a point above or preferably just below the interface of the dense solids phase. In this manner, at least a portion of the retorted oil vapors may be liberated in the upper portion of the bed and withdrawn therefrom without rising through a deep bed of highly adsorptive fine shale particles by which it may be adsorbed and carried to the burner, which is highly undesirable. Simultaneously, overhead entrainment of shale fines from the retort is reduced in this manner, because by preventing oil adsorption as described the carbon content and with it the gas buoyancy of the shale fines are kept low. Finally, flash vaporization of oil and water from the fresh shale which frequently leads to violent surges in the dense bed with spurts of shale fines thrown into the dispersed phase, may be avoided. All these effects cooperate substantially to improve operation and liquid yields of the process.

Having thus described its objects and general nature the invention will be best understood from the following more detailed description wherein reference will be made to Figures 4 and 5 of the drawing.

Referring now to Figure 4 the system illustrated therein essentially comprises a distillation chamber or retort 10 and a combustion chamber or burner 40, the functions and cooperation of which will be forthwith described using as an example the distillation of an oil shale containing about 0.5 bbl. of distillable oil constituents per ton. It should be understood, however, that other oil-bearing minerals may be treated in a substantially analogous manner.

In operation, feed hopper 1 contains fresh oil shale crushed to a particle size of about 3 to 200 mesh. A suitable particle size distribution of the fresh shale may be about as follows:

| Mesh size: | Weight, percent |
|---|---|
| On 4 mesh | 2 |
| Thru 4 on 10 mesh | 57 |
| Thru 10 on 20 mesh | 19 |
| Thru 20 on 200 mesh | 20 |
| Thru 200 mesh | 2 |

The shale in hopper 1 may be preheated to any desired temperature of, say, about 300°–500° F. and simultaneously dried in any manner known per se, for example in heat exchange with hot product or flue gases. Fresh shale flows from hopper 1 downwardly through line 5. The solids flow may be controlled by suitable means, such as a screw conveyor, star feeder, reciprocating slide valve, etc. The fresh shale discharges into an upper or intermediate portion of retort 10.

Simultaneously, a gas such as product tail gas, steam, $CO_2$ or other inert gas containing suspended hot solids supplied from burner 40 as will appear more clearly hereinafter, is fed to the lower portion of retort 10 from line 12 through a suitable distributing device, such as a grid or inverted cone 14. Retort 10 is so designed that at the prevailing conditions of solids circulation and carrier gas rates the superficial linear velocity of the gas in retort 10 is about 1.2 to 1.5 ft. per second. Sufficient hot solids from burner 40 are supplied with the gas through line 12 and cone 14 to maintain within retort 10 a solids temperature of about 900°–1200° F., preferably about 950°–1100° F., suitable for shale distillation. At the conditions specified, a fluidized highly turbulent relatively dense shale bed $M_{10}$ having a well defined upper interface $L_{10}$ is formed in retort 10 and distillation takes place. As a result, the fresh shale disintegrates rapidly to form about 20–40% of fines having a particle size of less than 20 microns.

At equilibrium conditions and in the absence of added extraneous solids of intermediate particle size, bed $M_{10}$ may have an apparent density of about 20 to 35 lbs. per cu. ft. and a particle size distribution about as follows:

| | Percent |
|---|---|
| 0–20 microns | 20–30 |
| 20–60 microns | 5–15 |
| 60–200 microns | 5–15 |
| 200–400 microns | 40–50 |
| >400 microns | <10 |

However, in the example illustrated by Figure 4, extraneous solids having a particle size of about 60–200 microns are added to the system from hopper 30 as will appear more clearly hereinafter. These solids may be added in such proportions as to establish an actual particle size distribution within mass $M_{10}$ about as follows:

| | Percent |
|---|---|
| 0–20 microns | 20–25 |
| 20–60 microns | 5–15 |
| 60–200 microns | 30–40 |
| 200–400 microns | 20–30 |
| >400 microns | <5 |

In accordance with the preferred embodiment of the invention, these extraneous solids have cracking activity and may comprise therefore such conventional cracking catalysts as mixed silica-alumina gels, silica-magnesia composites, or the like.

A mixture of product vapors and gases with fluidizing gas, containing about 0.001 to 0.03 lb. of entrained solids per cu. ft. of gasiform material passes overhead from interface $L_{10}$ to form a dilute solids-in-gas suspension above level $L_{10}$. This suspension is passed through line 15 to a system of gas-solids separator, such as cyclones 16, 17 and 18, wherein most of the entrained solids are separated to be returned to bed $M_{10}$ through dip pipes 19, 20, and 21, respectively. Vapors and gases now containing merely about 0.001 to 0.004 lb. per cu. ft. of entrained solids fines are withdrawn through line 23 and may be passed to a conventional product recovery system (not shown) which preferably includes settling or filtering means for the final removal of entrained solids fines prior to or during distillation. The fines so recovered may be discarded, recycled to the retort in a concentrated slurry, or supplied to burner 40, if desired, or used as fuel in other sections of the system. As a result of the low fines carry-over, no difficulties arise from slurry formation in the product recovery system.

A carbonized mixture of spent shale and extraneous solids is withdrawn from the bottom of retort 10 through an aerated standpipe 25 at a rate controlled by slide valve 27. If desired, the solids may be stripped of volatile products by small amounts of a stripping gas such as steam which may be introduced through line 26 into the annular space surrounding distributing cone 14 in the bottom of retort 10. The withdrawn solids are passed into line 29 wherein they are picked up by a combustion-supporting gas such as air preferably preheated to about 800°–1000° F. in heat exchange with process flue gases. If desired, a minor portion of the solids in standpipe 25, say about 10–40%, may be passed with the aid of an inert carrier gas, such as steam, through line 32 into the upper portion of the inner combustion section 45 of burner 40. The flow velocity of the gas in line 29 may be maintained as low as about 30–33 ft. per sec. as a result of the presence of more than 10% of 0–20 microns material. This is an advantage because higher velocities would cause excessive attrition. The suspension formed in line 29 is passed through a distributing cone 35 to the lower portion of inner combustion section 45 of burner 40. Make-up catalyst or other extraneous solid of intermediate particle size may be supplied from hopper 30 through standpipe 34 to line 29 and combustion section 45. The amount of oxygen supplied through line 29 should be sufficient to maintain by combustion a burner temperature about 50°–200° F. higher than the temperature maintained in retort 10.

Particle size control by fines elutriation takes place in burner 40 as follows. As shown in Figure 4, burner 40 contains an inner combustion section 45 having a lower portion 47 of relatively large diameter and an upper portion 49 of relatively small diameter. Combustion section 45 is so designed that at the prevailing gas feed rate a superficial linear gas velocity substantially below 1.5 ft. per second, preferably between about 0.5 and 1.0 ft. per second is maintained in the lower portion 47. At this velocity, effective segregation of coarse particles within a size range of about 400 to 7,000 microns from particles of less than 400 microns takes place. The coarse material concentrates in the bottom of portion 47 from which it may be withdrawn through standpipe 51 to be further handled as will appear hereinafter. The finer material concentrates in the upper and middle sections of portion 47 which is provided with a plurality of ports 53 connecting portion 47 with the annular space formed by the walls of burner 40 and combustion section 45. The particles of less than 400 microns concentrating in the middle section of portion 47 pass through ports 53 into the annular burner space and, in the absence of a supporting fluidizing gas, drop down to the bottom of burner 40 from which they are withdrawn through standpipe 55 to be further treated as will appear hereinafter. If desired, a small amount of an aerating and/or stripping gas, such as steam or product gas, may be introduced through taps $t$ into the bottom of this annular space in order to remove adhering flue gas and facilitate the flow of the solids, all in a manner known per se.

Particles of less than 400 microns diameter concentrate in the top of portion 47 and, as a result of the decreasing diameter of portion 47 and the thus increasing gas velocity, are carried into upper portion 49 of smaller diameter. Portion 49 is so designed that a superficial linear gas velocity of at least 1.5 ft. per second, preferably between about 2.0 and 4.0 ft. per second, is established. At these velocities, at least a major proportion of the fines of 0–20 microns size is fully entrained and carried overhead by the flue gases which may also carry along minor amounts of larger particles in the 20–60 micron range.

The last mentioned relatively dilute suspension which may contain about 0.010 to 0.035 lb. of solids per cu. ft. is withdrawn through line 57 and passed to a primary cyclone separator 59 in which particles larger than 20 microns are separated either to be returned through dip pipe 61 provided with control valve 63 to the middle section of portion 47 of combustion section 40 or to be discarded via line 65 and spent shale accumulator 75. The remaining solids-in-gas suspension flows through line 67 to an additional separating system which may comprise two or more cyclones 69 and 70 and/or electric precipitators 71 for the substantially complete removal of shale fines which may be collected in accumulator 75 via dip pipes 72, 73, and 74, respectively. Spent shale may be disposed of from accumulator 75 via standpipe 77, preferably after cooling below its ignition temperature of about 300°–500° F.

Returning now to burner 40, the coarse material withdrawn from the bottom of portion 47 via standpipe 51 may be passed to line 79, suspended therein in a carrier gas, such as air, and passed to the cyclone 69 from which the separated coarse material flows through line 72 to spent shale accumulator 75. The intermediate size particles withdrawn through standpipe 55 are passed at a rate controlled by slide valve 56 to gas line 12 to be suspended therein and passed to retort 10 as described above substantially at the temperature of burner 40. The solids circulation rate through line 12 depends on the temperature differential between burner 40 and retort 10. A circulation rate of about 12 to 20 lbs. of hot solids per lb. of fresh shale fed is normally sufficient at the temperature differentials specified above.

It will be appreciated that operation in the manner described permits an effective removal of shale fines and a flexible control of the particle size distribution without any detrimental effect on the retorting, combustion and fluidization conditions in the retorting and combustion zones and largely independent of the fresh shale feed rate. The particle size segregation and fines removal in heater 40 may be intensified or moderated by a proper control of the superficial linear velocity of the fluidizing gas without affecting the degree of combustion. The gas velocity may be reduced by supplying smaller amounts of air enriched with oxygen while higher velocities may be established by diluting the air with inert gases, such as steam, flue gases, etc.

In many cases it may be desirable to vary the rate of fines removal without changing the velocity of the fluidizing gas. This may be accomplished by varying the point of fines withdrawal above the dense phase interface. Details of a device particularly suited for this purpose are illustrated in Figure 5 on an enlarged scale.

Referring now to Figure 5 there is shown the top of burner vessel 40 and portions of line 57 for the withdrawal of the shale fines suspended in the flue gases as described with reference to Figure 4. Line 57 has the form of a sliding pipe section which is slidably supported in a cover plate 41 of burner 40 by means of a stuffing box 90. A second stuffing box 92 supports pipe section 57 slidably in a stationary pipe section 57a. A rack 94 attached to pipe section 57 cooperates with a pinion 96 for the adjustment of the distance over which pipe section 57 penetrates into burner 40. Pinion 96 is preferably operated by remote control. The rate of fines removal may be increased or decreased by lowering or raising pipe section 57 so that the distance between its intake end and the interface of the fluidized bed in heater 40 will be decreased or increased. The more closely the intake end of pipe section 57 approaches the interface the higher will be the rate of fines removal and vice verse, at any given flow velocity of the fluidizing gas.

While stuffing boxes and a rack and pinion arrangement have been shown in Figure 5 for the purpose of lifting and dropping the intake end of pipe section 57, it will be understood that any mechanical equivalents of these means may be used. These and other modifications of the systems illustrated in the drawing will appear to those skilled in the art without deviating from the spirit of the invention.

The invention will be further illustrated by the following specific example.

Example

A system of the type illustrated in Figure 4 may be operated, for example, at the conditions tabulated below.

Retort:

| | |
|---|---|
| Temperature, °F | 950 |
| Residence Time, mins | 5 |
| Inventory, tons | 100 |
| Density, cu. ft | 30 |
| Diameter, ft | 20.5 |
| Bed height, ft | 20 |
| Bed velocity, ft./sec | 1.2 |
| Fluidizing gas s. c. f. m. (tail gas, steam, etc.) | 22,500 |
| Pressure, p. s. i. g | 15 |
| Carry-over, lb./cu. ft | 0.003 |
| (thru cyclones) tons/hr | 3 |

Burner:
  Percent carbon on freshly retorted shale entering burner — 3.2
  O₂ requirements, s. c. f. m — 3,280
  Air rate, s. c. f. m. (2% excess O₂) — 17,300
  Velocity in enlarged section, ft./sec — 0.7
  Velocity in small section, ft./sec — 3.5
  Diameter, ft.—
    Enlarged section — 42
    Small section — 19
  Burner temperature, °F — 1,020
  Pressure, p. s. i. g — 5
  Density, lbs./cu. ft.—
    Enlarged section — 40
    Small section — 20
  Bed height, ft.—
    Enlarged section — 15
    Small section — 5
  Inventory, tons — 435
  Residence, mins — 4
  Carry-over—
    lb./cu. ft — 0.03
    Tons/hr — .55
  Steam or inert gas rate, s. c. f. m — 10,000
Circulation and feed:
  Feed, tons/hr — 100
  Oil content of feed, gals/ton — 30
  Carbon content of feed, percent by weight — 12.2
  Circulation, tons/min — 20
  Inert diluent addition rate, tons/day — 5
  Coarse spent shale withdrawn from burner, tons/hr — 37

At these conditions, the particle size distribution in the various sections of the system may be as follows:

| Particle Sizes | Percent by Weight of Size Range (microns) | | | |
|---|---|---|---|---|
| | 0–20 | 20–60 | 60–200 | 200–7,000 |
| Burner: | | | | |
| Out Top | 65 | 25 | 20 | 0 |
| Out Bottom | 15 | 10 | 5 | 70 |
| Top of Bed | 30 | 20 | 40 | 10 |
| Central (Circulating) Bed | 20 | 10 | 45 | 25 |
| Retort: | | | | |
| Out Top | 98 | 2 | | |
| Bed | 18 | 10 | 43 | 29 |
| Inert Diluent | | | 100 | |
| Feed | | | 2 | 98 |

The foregoing description and exemplary operations have served to illustrate preferred embodiments of the invention but are not intended to be limiting in scope.

What is claimed is:

1. In the distillation of carbonaceous solids of the type of oil shale which disintegrate during distillation wherein the subdivided solids are distilled in the form of a dense turbulent mass fluidized by an upwardly flowing gasiform medium in a distillation zone, spent solids are subjected to combustion and highly heated in the fluidized state in a combustion zone and heat is supplied to said distillation zone in the form of sensible heat of solids circulating from said combustion zone to said distillation zone, the improvement which comprises passing a gas upwardly in a lower portion of said combustion zone at a superficial linear velocity of substantially less than 1.5 ft. per second whereby segregation of coarse particles having a diameter of about 400 to 7,000 microns from particles less than 400 microns in diameter takes place in said lower portion, increasing said velocity thereafter in an upper portion of said combustion zone substantially above 1.5 ft. per second whereby solids fines of 0–20 microns particle size are fully entrained and removed overhead from said combustion zone to form a fluidized mass of intermediate particles less than 400 microns but more than 20 microns in diameter above said fluidized coarse particles, returning at least a major portion of said segregated intermediate size particles to said distillation zone for the purpose of heat supply, and withdrawing said coarse particles downwardly from said combusion zone.

2. The process of claim 1 in which extraneous nondisintegrating solids having a particle size of about 60–200 microns are added to said circulating solids in amounts adequate to establish a concentration of about 25 to 50% of said 60–200 microns size solids in said distillation and combustion zones.

3. The process of claim 2 in which said extraneous solids have cracking activity.

4. The process of claim 1 in which the rate of fines removal from said combustion zone is controlled by varying the level of the point of fines removal above the interface of said fluidized solids in said combustion zone.

5. The process of claim 1 in which spent solids circulating from said distillation zone to said combustion zone are supplied to said combustion zone at a point not substantially below the upper level of the fluidized solids in said combustion zone.

6. The process of claim 1 in which fresh carbonaceous solids are supplied to said distillation zone at a point not substantially below the upper level of the fluidized mass in said distillation zone.

JAMES W. CARR, Jr.
LINDSAY I. GRIFFIN, Jr.
EDWARD W. S. NICHOLSON.

References Cited in the file of this patent

UNITED STATES PATENTS

| Number | Name | Date |
|---|---|---|
| 2,337,684 | Scheineman | Dec. 28, 1943 |
| 2,353,505 | Scheineman | July 11, 1944 |
| 2,396,709 | Leffer | Mar. 19, 1946 |
| 2,399,050 | Martin | Apr. 23, 1946 |
| 2,480,670 | Peck | Aug. 30, 1949 |
| 2,483,485 | Barr | Oct. 4, 1949 |
| 2,548,026 | Kaasa | Apr. 10, 1951 |

FOREIGN PATENTS

| Number | Country | Date |
|---|---|---|
| 578,711 | Great Britain | July 9, 1946 |
| 586,391 | Great Britain | Mar. 18, 1947 |
| 600,326 | Great Britain | Apr. 6, 1948 |